United States Patent [19]

Creedon

[11] Patent Number: 5,065,795
[45] Date of Patent: Nov. 19, 1991

[54] PRESTRESSED CONCRETE ARTICLES

[75] Inventor: Richard L. Creedon, San Diego, Calif.

[73] Assignee: General Atomics, San Diego, Calif.

[21] Appl. No.: 488,884

[22] Filed: Mar. 5, 1990

Related U.S. Application Data

[62] Division of Ser. No. 317,821, Mar. 1, 1989, Pat. No. 4,936,006.

[51] Int. Cl.$^5$ .................................................. F16L 9/08
[52] U.S. Cl. ..................................... 138/176; 138/175; 264/228
[58] Field of Search ................... 138/175, 176, 174; 29/421.1, 446, 452; 264/228, 570

[56] References Cited

U.S. PATENT DOCUMENTS

| | | | |
|---|---|---|---|
| 1,965,748 | 6/1955 | Mitchell | 72/54 |
| 2,048,253 | 7/1936 | Freyssinet | 25/41 |
| 2,080,074 | 5/1937 | Freyssinet et al. | 72/61 |
| 2,153,741 | 4/1939 | Cobi | 25/154 |
| 2,210,553 | 8/1940 | Miller | 25/118 |
| 2,395,216 | 2/1946 | Fitzpatrick | 25/128 |
| 2,474,660 | 6/1949 | Fitzpatrick | 25/154 |
| 2,569,612 | 10/1951 | Laurent | 29/148.2 |
| 2,585,446 | 2/1952 | Edwin et al. | 25/154 |
| 2,683,915 | 7/1954 | Tournon | 25/154 |
| 2,709,845 | 6/1955 | Serkin | 25/154 |
| 3,056,183 | 10/1962 | Pigeot | 25/154 |
| 3,107,158 | 10/1963 | Ahlberg | 25/154 |
| 3,202,740 | 8/1965 | Patin | 264/100 |
| 3,249,665 | 5/1966 | Bearden et al. | 264/94 |
| 3,260,020 | 7/1966 | Patin | 52/2 |
| 3,287,801 | 11/1966 | Blenkarn | 29/460 |
| 3,397,260 | 8/1968 | Lamberton | 264/86 |
| 3,468,090 | 9/1969 | L'Hermite | 52/309 |
| 3,550,339 | 12/1970 | Yanai | 52/250 |
| 3,567,816 | 3/1971 | Embree | 264/228 |
| 3,656,231 | 4/1972 | Sheldon et al. | 29/624 |
| 3,687,380 | 8/1972 | Magers et al. | 242/7.21 |
| 3,737,493 | 6/1973 | Hacker | 264/42 |
| 3,758,940 | 9/1973 | Lamy | 29/460 |
| 4,005,828 | 2/1977 | Peszeszer | 242/7.21 |
| 4,019,301 | 4/1977 | Fox | 52/725 |
| 4,023,374 | 5/1977 | Colbert et al. | 61/54 |
| 4,071,996 | 2/1978 | Muto et al. | 52/741 |
| 4,153,656 | 5/1979 | Bunyan | 264/40.1 |
| 4,247,516 | 1/1981 | Morgan | 264/503 |
| 4,439,070 | 3/1984 | Dimmick | 405/216 |
| 4,529,567 | 7/1985 | Richard | 264/228 |
| 4,694,622 | 9/1987 | Richard | 52/223 R |
| 4,771,530 | 9/1988 | Creedon | 29/421.1 |

*Primary Examiner*—James E. Bryant, III
*Attorney, Agent, or Firm*—Fitch, Even, Tabin & Flannery

[57] ABSTRACT

A prestressed concrete article including overlying the ends of the article and having gasket rings between the article and the end walls. A hardenable medium is injected between the jacket and the concrete article and generates a sufficient pressure so as to outwardly bulge the jacket, drawing the end walls together thereby compressing the gaskets.

6 Claims, 2 Drawing Sheets

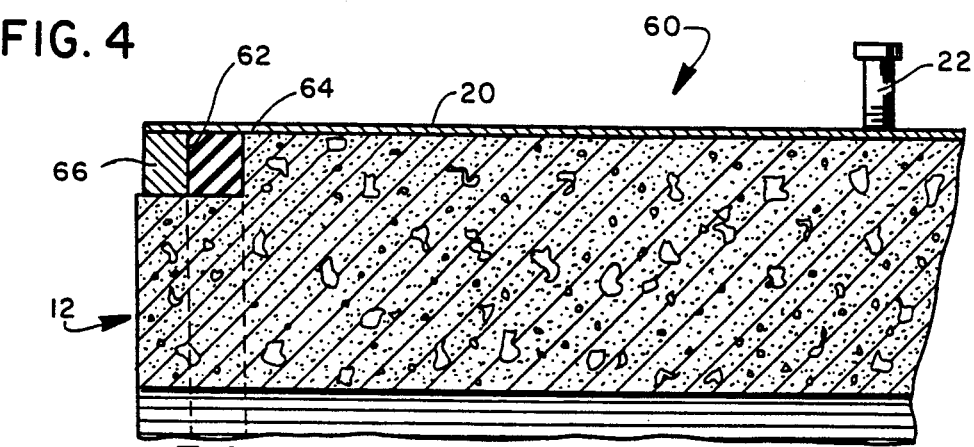
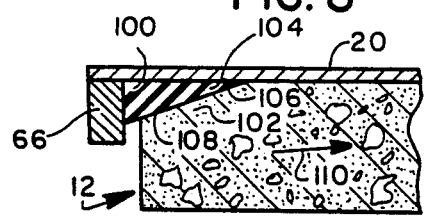
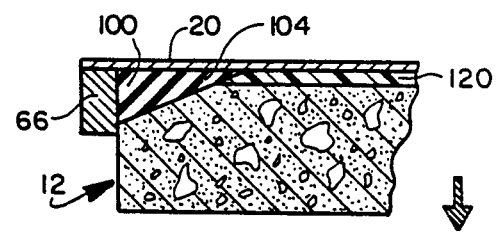
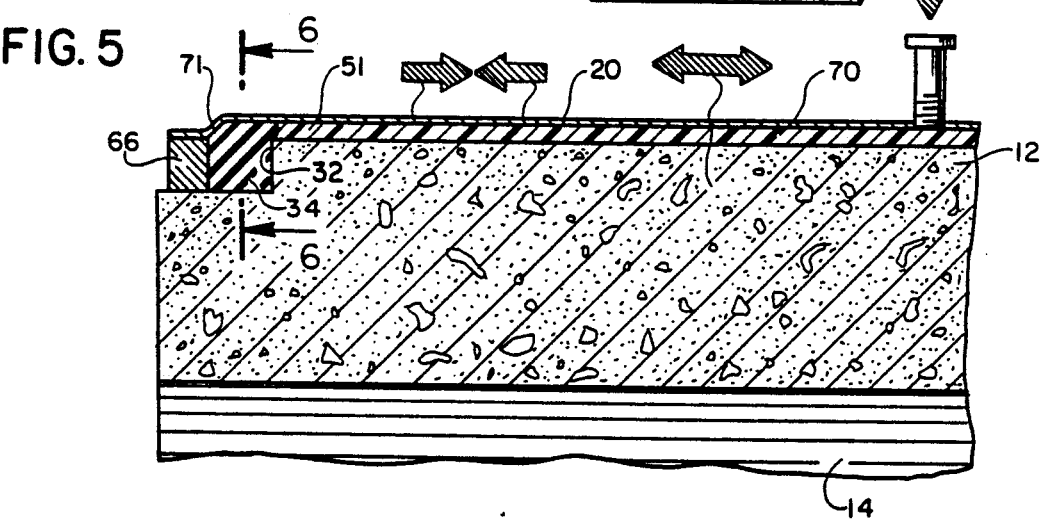
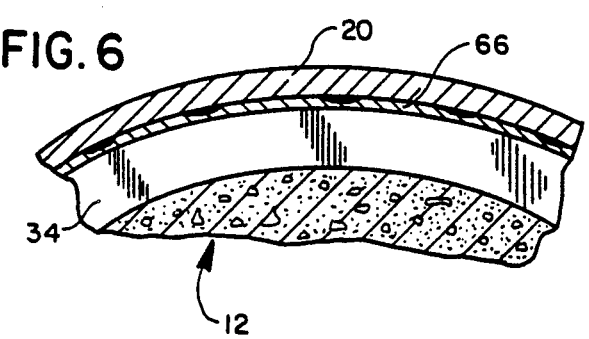
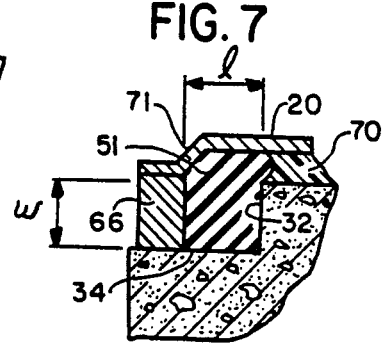

PRESTRESSED CONCRETE ARTICLES

CROSS REFERENCE TO RELATED APPLICATIONS

This is a division of U.S. patent application Ser. No. 317,821 filed Mar. 1, 1989 now U.S. Pat. No. 4,936,006.

BACKGROUND OF THE INVENTION

1. Field of the Invention

The present invention pertains to prestressed concrete members and in particular to structural concrete members which are prestressed using post-tensioning techniques.

2. Description of the Related Art

Prestressed concrete members are used extensively in modern construction practices. Prominent applications of prestressed concrete include bridges, building columns and liquid storage tanks. Common to each of these applications, is a goal of eliminating tension forces in the concrete members. Such tension loads in the concrete member have, in the past, been avoided by the use of either pre-tensioning or post-tensioning techniques. In this latter technique, the reinforcement members, such as those frequently comprised of steel tendons embedded within the concrete article, and are tensioned after the concrete hardens so as to place the concrete structure in compression.

U.S. Pat. No. 4,771,530, commonly assigned, discloses an improved method for the post-tensioning of concrete members wherein the concrete member is disposed within an outer rigid casing. A cementitious grout is then injected between the outer rigid casing and the outer surface of the cylindrical concrete member. The grout is allowed to harden to form a permanent prestressing pressure on the concrete article. Once the fluidically injected medium is hardened, the risk of loss of the medium from the assembly is eliminated. While finding ready commercial acceptance, certain improvements could be made to these prestressed articles. For example, resilient seals must be provided between the concrete article and the outer rigid casing, particularly at the ends thereof, to prevent loss of the prestressing medium which is fluidically injected between the casing and the concrete article. Resilient gaskets employed in the aforementioned prestressed articles are typically hidden from view behind the rigid casing. For resilient gaskets of fixed size, particularly a fixed cross-sectional size, the compressing pressure on the gaskets which is relied upon to form a seal against the pressure of the injected medium is controlled at the time of fabrication of the outer casing and cannot thereafter be easily adjusted as desired, in preparation for the grout injection.

SUMMARY OF THE INVENTION

It is an object according to the present invention to provide an improved seal between a concrete article and a surrounding outer casing.

Another object according to the present invention is to provide a resilient seal for a prestressed concrete article in which the strength of the seal automatically increases with increased fluid pressure which the seal is relied upon to withstand.

A further object according to the present invention is to provide a seal for a prestressed concrete article which is automatically set in operation as a pressurized medium is applied against the seal.

These and other objects according to the present invention which will become apparent from studying the appended description and drawings are provided in a method of prestressing a concrete article having opposed ends, and a cylindrical outer surface, comprising the steps of:

surrounding the outer cylindrical surface of the concrete article with a cylindrical jacket having opposed ends adjacent the ends of the article and a predetermined strength to resist deformation when placed under pressure;

overlying the ends of the concrete article, adjacent the ends of the jacket, with end walls having a greater strength to resist deformation;

disposing gasket rings between the end walls and the ends of the concrete article;

joining ends of the jacket to the end walls so that tension forces applied to the jacket compress the end walls against the ends of said concrete article;

fluidally injecting a hardenable medium between said jacket and said concrete article outer surface so as to urge said hardenable medium to migrate throughout said concrete article outer surface, and to swell said jacket so as to form an annular cavity between said jacket and said concrete article outer surface, so as to fill said cavity with said hardenable medium; and pressurizing said hardenable medium in said cavity with a pressure so as to outwardly bulge said outer jacket so as to contract the ends of the jacket and to compress said gasket rings against the ends of said concrete article by an amount which causes portions of said gasket rings to enter said cavity so as to intimately engage and generate a sealing pressure between opposed portions of said jacket and said concrete article outer surface;

whereby a fluid-tight pressure cavity is formed surrounding the outer surface of said concrete article and maintaining the pressure until the injected medium hardens.

Other objects are attained in a prestressed concrete article comprising:

a cylindrical body with opposed ends and a generally cylindrical outer surface;

a cylindrical jacket having a predetermined strength to resist distortion when placed under pressure, said jacket placed around the outer cylindrical surface of the concrete article;

end walls of greater strength overlying the ends of the article, adjacent the ends of the jacket;

gasket rings between the end walls and the ends of the concrete article;

end joining means for joining the ends of the jacket to the end walls so that tension forces applied to the end walls compress the end walls against the ends of said concrete article;

a hardenable medium fluidically injected between said jacket and said outer surface of said concrete article, migrated throughout the major portion of said concrete article outer surface;

an annular cavity between said jacket and said concrete article outer surface formed by an outward swelling of said jacket by said injected medium, said cavity filled with said hardenable medium; and ends of the jacket being pulled together, pressing said gasket rings against the ends of said concrete article, so as to draw portions of said gasket rings into said cavity, intimately engaging and generating a sealing pressure between opposed portions of said jacket and said concrete article outer surface;

whereby a fluid-tight pressure cavity is formed surrounding the outer surface of said concrete article and maintaining the pressure until the injected medium hardens.

As contemplated by the present invention, injected pressures range between 100 and 1,000 psi, with jackets of correspondingly appropriate size and strength. The pressure medium injected between the jacket and the outer surface of the concrete article, places the jacket in tension and the concrete article in desired prestressed compression.

BRIEF DESCRIPTION OF THE DRAWINGS

In the drawings, wherein like elements are referenced alike:

FIG. 4 is a fragmentary cross-sectional elevational view of an alternative embodiment of a concrete article prior to pressure injection;

FIG. 5 is a fragmentary cross-sectional view similar to that of FIG. 4, but showing a pressurizing medium injected therein;

FIG. 6 is a fragmentary cross-sectional view taken along the line 6—6 of FIG. 5; and FIG. 7 is a fragmentary cross-sectional view showing an outer corner of the concrete article of FIG. 5 on an enlarged scale.

DETAILED DESCRIPTION OF THE PREFERRED EMBODIMENT

Figure 1:
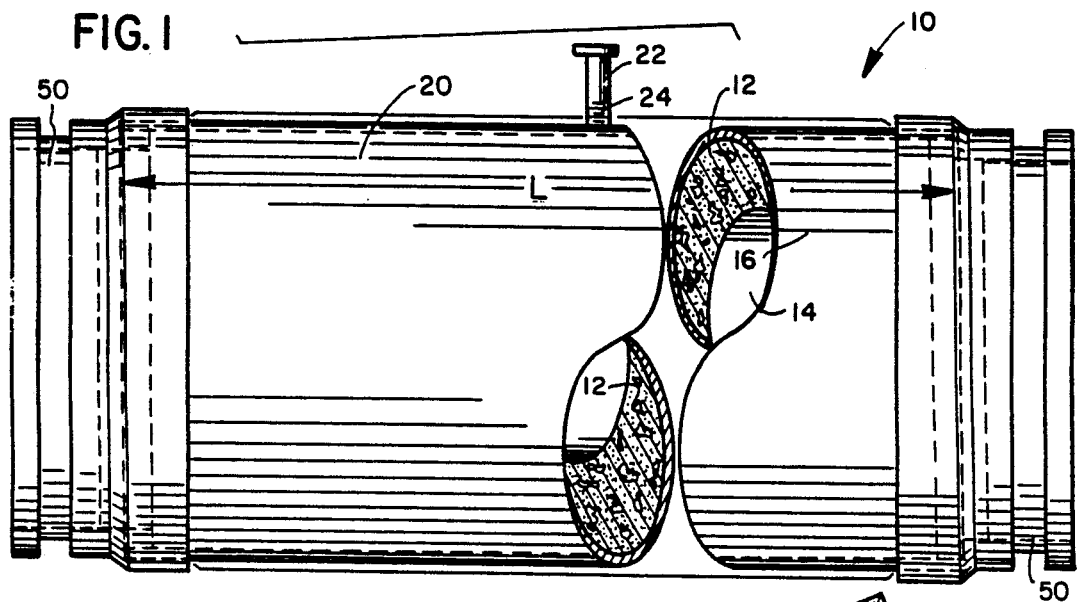
FIG. 1 is a side elevational view of a concrete article illustrating aspects according to the present invention.
Figure 2:
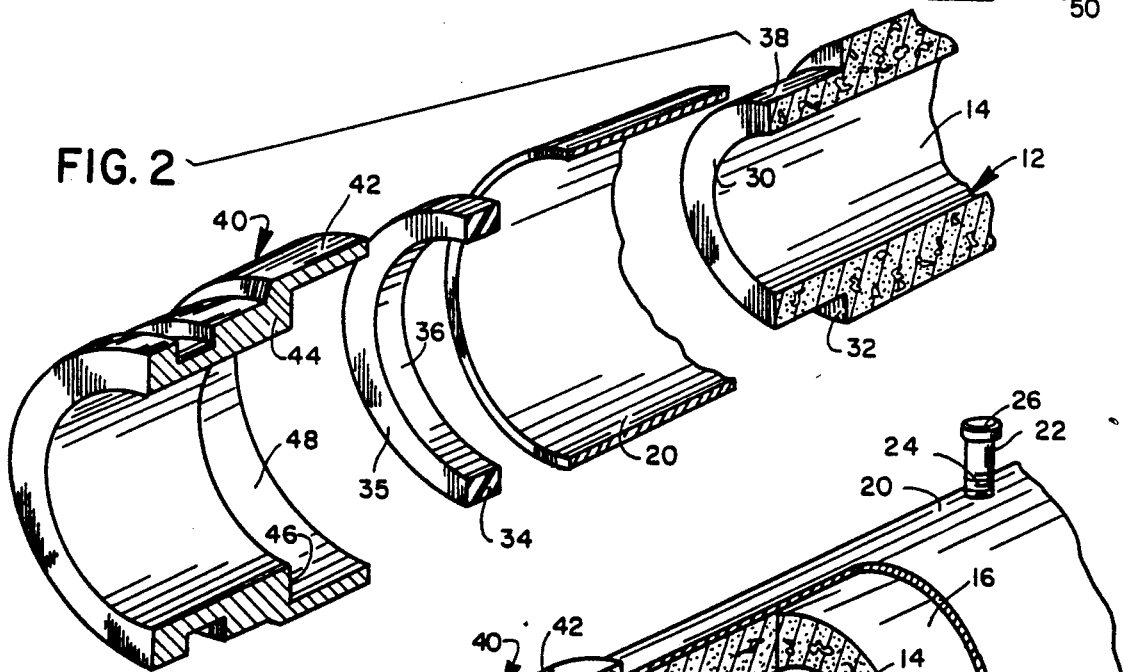
FIG. 2 is an exploded perspective view of a first end of the concrete article of FIG. 1.
Figure 3:
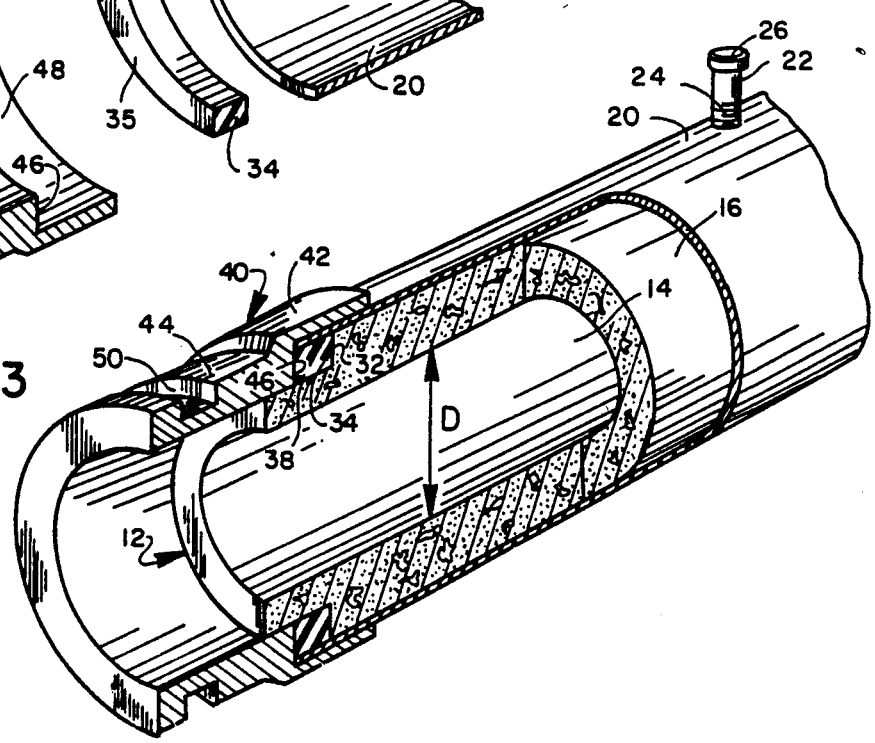
FIG. 3 is a fragmentary perspective view, shown partly broken away, of a first end of the concrete article of the preceding figures.

Referring now to the drawings, and especially to FIGS. 1-3, a first embodiment of an assembly for a concrete article such as a hollow cylindrical pipe is generally indicated at 10. Pipe assembly 10 includes an inner, generally cylindrical concrete member 12 having interior and exterior cylindrical wall surfaces 14, 16, respectively. A cylindrical sleeve or jacket 20 is disposed about pipe 12, and initially is placed close to or in intimate engagement with the outer surface 16 thereof.

A second embodiment of a concrete pipe assembly is illustrated in FIGS. 4-7, and will be discussed below.

Both embodiments of the present invention are concerned with post-tensioning of concrete articles, where a hardenable medium is fluidically injected in a concrete assembly preferably after the concrete article has cured and hardened sufficiently. According to one aspect of the present invention, material costs and labor costs are significantly reduced since the finished concrete article does not contain interior steel members for reinforcement, attachment, or the like purpose. Preferably, the fabrication of the concrete article, herein a hollow concrete pipe 12, uses conventional techniques and does not require any special processing, such as pressurizing or otherwise treating the concrete material as it hardens.

As will be seen, the jacket 20 is tensioned with a relatively high tension stress, generally between 100 and 1,000 pounds per square inch. Accordingly, jacket 20 is made of any suitable material which is able to withstand the high tension loading. In the preferred embodiment, the jacket 20 is made of a type of steel capable of withstanding very high tensile loads, such as steel types 4130 or M220. Other materials, such as fiber-inforced epoxy can also be used, if desired. The injected pressure medium is constrained by both the jacket and the concrete pipe. In general, according to one aspect of the present invention, the jacket 20 is constructed so as to be more deformable than the concrete pipe.

The pipe assembly 10 illustrated in FIGS. 1-3 is shown at a point in time prior to the prestressing thereof. As will be seen, a fluid, but hardenable pressure medium is injected between jacket 20 and concrete member 12. In order to facilitate injection of the pressurizing medium, a suitable number of spigot-like injection couplings 22 are provided. Only one such coupling is shown in the figures, however. Coupling 22 penetrates jacket 20 and is joined thereto with a pressure-tight seal.

In one embodiment, an internally threaded flange is disposed within jacket 20 in registry with an aperture in the jacket. Coupling 22 has a hollow threaded body with external threads 24 mateable with the internal flange. An external flange, not shown, is advanced along the threaded body of the coupling and provides a pressure-tight seal with the jacket. As a preferable alternative, the pipe-like injection coupling 22 is welded or brazed to the jacket. In any event, coupling 22 provides a hollow interior passageway 26 communicating with the interface between jacket 20 and the outside surface 16 of article 12.

The couplings 22 provide a series of access points for injecting a high pressure medium into the boundary between the jacket and the outer surface of the concrete article. As the fluid is injected through the couplings 22, the jacket is outwardly expanded so as to form a generally lenticular cavity or grout space 51 between the inner surface of the jacket and the outer surface of the concrete article 12. The cavity 51 is illustrated in FIGS. 5 and 7 with exaggerated dimensions, for purposes of clarity.

As seen most clearly in FIGS. 2 and 3, the major portion of the outer surface of concrete member 12 has an outer diameter D, and the inner bore of the concrete member is constant throughout. The concrete article 12 has a stepped portion defining a lateral wall 32 and a cylindrical end portion 38 of reduced diameter. Thus, the lateral wall 32 appears at the transition between the two outer diameters of the concrete member.

An annular gasket 34 is seated against wall 32, in the manner illustrated in FIG. 3. The radially inner surface 36 of gasket 34 seats against the outer surface of the end portion 38 of concrete member 12. As will be seen, the high pressure gasket or seal 34 of flexible material is installed at each end of the grout space 51 to contain the injected pressure medium, until the medium hardens or cures. The gasket 34 can comprise either hollow or solid rings of VITON or BUNA-N rubber, for example. Other gasket configurations and materials are, of course, possible.

When a pressurized medium is fluidically injected through the couplings 22, the fluid displaces the outer casing (and, to a much lesser extent, the concrete article) to form a generally lenticular cavity 51 as the fluid migrates under pressure, in radial and longitudinal directions, along the boundary between the concrete article and the jacket, until migration is halted by gaskets 34.

Initially, migration may be encouraged by asperities in the outer surface of concrete article 12. In either event, migration is relatively unimpeded, due to the low peel strength of the bond between the concrete and the jacket, which can be adjustably controlled by coating the interior surface of the jacket with a release compound such as oil.

In one of its aspects, the present invention is particularly advantageous in fixing the gaskets 34 in place, free of leaks. A metallic end coupling, generally indicated at 40, is disposed at each end of pipe assembly 10. The end fitting 40 includes a collar portion 42 of reduced cross-sectional thickness and a relative massive body portion 44. Between body portion 44 and collar portion 42 there is located a transition or step at a step face 46. Collar 42 has an internal cylindrical surface 48 which, as illustrated in FIG. 3, overlies one end of jacket 20. In the preferred embodiment, collar 42 is welded to the outer surface of the jacket end portion. Alternatively, the collar 42 could also be brazed, or bonded to the jacket with an epoxy or other suitable adhesive. End fitting 40 includes a recessed groove 50 to facilitate rapid connection to an external conduit system (not shown in the drawings). The recessed groove 50 is unimportant to the practice of the present invention, and does not play an important role in the prestressing of the concrete member 12.

Referring now to FIGS. 4-7, an alternative embodiment of the concrete pipe assembly 10 is illustrated at 60. The concrete pipe assembly 60 is substantially identical to the concrete pipe assembly 10 of the preceding figures, except for the configuration of the end fittings 66 thereof, which are simpler in configuration compared to end fittings 40. The end fittings 66 are relatively massive compared to the jacket 20. In the preferred embodiment, the jacket is welded to the end fitting.

It is generally preferred in both embodiments that the jacket 20 be used as a form within which concrete material for the pipe is cast. Alternatively, however, the jacket 20 can be applied around an existing concrete article. After the jacket 20 is in place and the concrete article is cured or hardened, a series of holes are drilled in the jacket 20 so as to penetrate the boundary between the jacket and the outer surface of the concrete article. A series of pipe-like injection couplings 22 are attached to the jacket 20 and are joined thereto in a pressure-tight fashion, preferably by welding.

Prior to pouring of the concrete material, an end fitting 40 and a gasket 34 are installed at a first end of the jacket. Next, a generally cylindrical form member having an outer diameter corresponding to the inner diameter D of the concrete member is installed, concentric with the jacket. When removed, the cylindrical form produces the void in the concrete member comprising the internal bore, or interior wall surface 14 thereof. Next, the jacket, end fittings and central form associated therewith are oriented in a vertically upright position with the first end at the bottom and concrete is poured within the jacket 20.

After the concrete hardens, a gasket 34 and end fitting 40 are applied to the upper end of the assembly, and the collar 42 of the end fitting is bonded to jacket 20. If desired, the gasket 34 and end fitting can be applied to the assembly prior to hardening of the concrete cast within the jacket. This latter alternative offers certain advantages, especially if the end fitting is welded to the jacket. As will be seen, the compression of gaskets 34 is relied upon to provide a pressure-tight seal between the jacket and concrete member. It is important therefore that the gaskets 34 be maintained in close, intimate engagement with the concrete member prior to injection of the pressure medium. As will be seen, pressure initially applied to the gaskets 34 is greatly augmented during fluid injection. However, the amount of compression is directly related to the inward travel of the ends of the pipe.

In the preferred mode of construction, the pressurized fluid migrates outwardly from the couplings 22, through asperities in the outer concrete surface. The peel strength of the bond between the concrete and the jacket is small, and is easily overcome by the pressurized medium. In a relatively short time, and without notable difficulty, the pressure medium entirely surrounds the concrete article, extending from one end to the other thereof, between the pressure seals. In one of its aspects, the present invention is particularly advantageous in fixing the gaskets 34 in place, free of leaks. In time, the fluidically injected medium hardens, and the problems of fluid leaks are no longer present. Accordingly, any change in the gasket, for example a deterioration of the resilience thereof, does not play a critical role when the present invention is practiced.

The amount of swelling of the jacket can be readily determined through the use of stretchable measuring tapes applied around the girth of the jacket, prior to pressurization and consequent swelling. Using known principles, the amount of expansion in girth as measured by the measuring tape, can provide an accurate indication of the pressurization forces applied to the concrete article.

In particular, the present invention contemplates a high pressure medium comprising a grout of either plastic, epoxy resin, or cementitious material which is fluidically injected between the jacket and outer surface of the concrete article, and is thereafter allowed to cure or harden into a solid form. As used herein, the terms "cement" or "cementitious materials", as applied to the pressurized medium, refer to hydraulic cements and the like, which typically include calcium (e.g., calcium oxide and calcium sulphate), silicone (e.g., silicone oxide), and other similar elements, and are usable for making Portland Cement, concretes, mortars (including stuccos and plasters such as plaster of Paris), grout, and other like materials. More specifically, these terms are not intended to include adhesives commonly referred to "cements", such as vinyl cement, plastic cement, rubber cement, or the like, which are used to bond vinyl, plastic, rubber, and other components.

By way of illustration only and not limitation, the cylinder 12 was fabricated with a five foot outside diameter, a wall thickness of approximately 5 inches. The jacket 20 comprised steel material of either the 4130 or M220 type, approximately one-sixteenth inch in thickness. The pressurized medium comprised a cement grout injected at over 200 psi and allowed to cure into a pressurized form. When employed as a pressure vessel, the concrete article is estimated to successfully withstand internal pressures of 200 psi without bending or other deformation.

The inward contraction at the ends of the jacket results from the outward bulging of jacket 20 and the absolute amount of inward compression or travel of the jacket ends is somewhat limited in practice. Accordingly, it is important that the range of travel of the jacket ends be utilized for contraction of gasket 34, rather than eliminating a substantial amount of spacing, or gaps between the gasket, the end fitting and the concrete member 20.

As illustrated in the Figures, gasket 34 has a generally rectangular or square-shaped cross section, with opposed annular faces 35 abutting the step face 46 of end fitting 40 and the step wall at the end of concrete member 12. Preferably, the opposed annular faces 35 of gasket 34 are compressed at least a minimal amount between concrete member 12 and end fitting 40, prior to injection of the pressure medium. Any subsequent axial shrinking of the jacket 20 due to the outward bulging thereof, will be converted into a compressor force acting upon gaskets 34, thus augmenting the ceiling pressure thereof. Assuming a controlled amount of axial shrinking of jacket 20, and an initial compression of gasket 34 between end fitting 40 and the concrete member, the final compression of the gasket can be controlled quite closely.

Such control, however, depends upon a proper initial compression between the end fitting and the concrete member. In the preferred embodiment, a first end of the concrete pipe is disposed at the bottom of the assembly, prior to a pouring of a concrete mixture within the jacket. Thus, there is little control over the intimate engagement of the concrete, gasket and end fitting at the lower end of the assembly, but the weight of the poured concrete ensures the desired intimate contact and initial compression of the gasket 34 at the lower end of the assembly.

Control over the initial compression of the gasket 34 at the upper end of the assembly, however, raises a different problem as intimate engagement with the end fitting and concrete member is not automatically assured. It is important, in order to obtain an adequate initial, prepressure injection seal of gasket 34, that the upper annular face thereof project beyond or at least be flush with the free end of jacket 20 when in contact with the step wall 32 of the concrete member. When the upper end fitting 40 is telescoped over the upright assembly, its step face 46 must be in intimate engagement with or spaced closely adjacent to the upper annular face of gasket 34 because the positioning of the end fitting relative to the gasket and annular wall of the concrete member cannot be adjusted once the end fitting is welded to the jacket. The same is true of the second embodiment 60, as well. Accordingly, it is important that the proper amount of pressure, necessary for an initial seating of gasket 34 be applied to the upper end of the assembly prior to welding of the end fitting to the jacket.

Alternatively, the distance between the free end of collar 42 and the step face 46 of end fitting 40 can be accurately measured and this distance can be measured from the free end of jacket 20. During assembly, the amount of telescopic insertion of jacket within the collar 42 can be compared against the measured distance to ensure the proper compression of gasket 34 or spacing therefrom by the step face 46. Generally, it is desirable that step face 46 be pressed against gasket 34 prior to injection of the pressure medium, with inward compression of the ends of jacket 20 due to an outward bulging thereof applied exclusively to increase the pressure force against gasket 34. However, the present invention contemplates a range of material properties for practical examples of gasket 34. For example, the amount of inward compression of jacket 20 may exceed the required compression of gasket 34 and, accordingly, it is desirable to provide a very closely controlled spacing between the upper end fitting and the gasket 34 so that the gasket is not compressed beyond an acceptable limit.

The material properties of gasket 34 are preferably chosen such that the amount of desired compression is attained only with a complete compression of the ends of the jacket as is possible in a practical embodiment. In this manner, initial alignment of gasket 34 during fabrication of the pipe assembly is relatively straightforward and no special care need be taken beyond ensuring an intimate initial engagement between the step face 46 of end fitting 40, so as to press the gasket against the annular wall 32 of the concrete member. As has been pointed out above, special attention must be paid to the telescopic insertion of the jacket 20 within collar 42 as direct visual observation of the gasket positioning and initial compression is not possible, the gasket being hid from view by the end fitting.

With the above-mentioned preparations having been completed, the concrete pipe assembly is ready for the fluid injection step. As mentioned above, coupling 22 defines a passageway communicating with the interface between the outer surface 16 of the concrete member and the jacket 20. The end fittings 40 are preferably continuously welded to jacket 20 so as to provide a continuous pressure-tight seal therewith. The injected medium may comprise grout, or epoxy, or other fluid material which, after injection under pressure, hardens upon the passage of a suitable time period.

In the preferred embodiment, the concrete member 12 is pressurized with a cementitious grout injected under a suitable pressure. As the grout enters the interface between jacket 20 and the outer surface of the concrete member, it pushes the jacket away from the outer surface of the concrete member, thus creating a cavity or a grout space between the two. The grout space continues to migrate or grow outwardly from the injection point flowing throughout the outer surface of the concrete member and migrating toward the ends thereof. According to one aspect of the present invention, the injected medium is made to flow throughout the outer surface of the concrete article, and thereafter the pressure applied to the medium is either maintained or raised to a sufficiently high level so as to outwardly bulge and deform jacket 20. The pressure level of the hardenable medium may therefore be raised in stages, but preferably is made high enough at the outset to both fill the cavity between the article and the jacket and to deform the jacket once the cavity is filled. Additionally, as a second order effect accompanying the injection, the outer concrete surface is crushed and compressed, but generally by a negligible amount.

As mentioned above, it is preferred that the deformation of the concrete pipe be negligible compared to that of the jacket, and the jacket materials and dimensions are chosen accordingly. In the preferred embodiment, the jacket 20 is made of relatively thin metal sheeting. The deformation of the end fitting body 40 must also be carefully controlled. According to another aspect of the present invention, the deformation of the end fitting body must be significantly less than that of the jacket 20, so that the outward bulging of the jacket contributes directly and as completely as possible, to the inward compression of the gaskets. In the preferred embodiment, the end fitting is made of metal, and has a thickness, and hence a strength much greater than that of the jacket.

During injection of the pressure medium, the steel sleeve grows in diameter and shrinks in axial length. As mentioned above, the concrete shrinks in outer diameter and grows in an axial direction, but the extent of this poissons deformation is negligible, being only a few percent of the magnitude of the deformation of the jacket. With reference to FIGS. 5 and 7, the decrease in outer diameter of the concrete member due to the aforementioned poissons deformation tends to release the gasket 34 by increasing its available volume defined by the annular wall 32, the end wall 66, and the circumferential wall 38 at the stepped portion of the concrete member and the jacket 20 surrounding the gasket. However, as mentioned above, and as a prominent feature according to the present invention, the contraction of the jacket 20 in axial length, decreases the available volume for the seal, thus increasing the internal pressure thereof. According to the present invention, the materials and configuration of the jacket, end wall and gasket, are chosen such that the net effect, when placed under pressure of the hardenable medium, is that the gasket 34 is squeezed in a diminishing volume sot that portions of the gasket intrude into the grout space, enhancing the grout confinement and the sealing performance of the gasket. The aspect ratio of the gasket and the concrete article, together with the poisson's ratio of the blank material, are key parameters in the design. It can be shown that reduction of nominal volume takes place when the ratio $$\frac{VLW}{Dl} \text{ is greater than one,}$$

where V is the poisson's ratio of the jacket, L is the axial length of the concrete article, W is the radial width of the gasket 34, D is the diameter of the concrete article, and l is the axial length of gasket 34. The above relationship can easily be satisfied by those skilled in the art, whether or not second order effects such as the concrete article shape changes and the radial restraint exerted by the cross-sectional area of the end wall are included or not.

As mentioned above, the pressure medium migrates toward the end fittings of the pipe assembly, swelling the outer jacket as the pressure medium approaches the end fittings. As can be seen by comparison of FIGS. 4 and 5, the outer diameter of jacket 20 is increased by an amount corresponding to the thickness of the pressure medium 70 wedged between the jacket and the outer surface of concrete member 12. As can be seen in FIG. 5, and in greater detail in FIG. 7, the outward swelling or expansion of jacket 20 is halted at the point of joinder of the jacket with the relatively massive end fitting 66, as indicated by the rounded surface 71 providing a transition between the original and the swelled or final expanded diameter of jacket 20.

As indicated in FIGS. 4-7, a cementitious grout or the like pressure medium 70 provides most but not all of the swelling of the jacket 20. In one embodiment of the present invention, the gasket 34 is deformed so that it contributes as well to the outer swelling of jacket 20 providing a cavity or increased diameter in the jacket within which the gasket can swell in a radially outward direction. As will be seen, the radially outward swelling is caused by an axial compression of the gasket.

In an alternative embodiment, the jacket surrounding the gasket 34 is not appreciably swelled by the radial expansion thereof. However, according to an important aspect of the present invention, the gasket 34 intrudes into the grout space. Such intrusion may be very small in absolute terms, but, as will be appreciated by those skilled in the art, any intrusion of the gasket in the grout space, even to a relatively modest extent, indicates an increased sealing pressure thereat. That is, the shear forces required to penetrate between the interface of the gasket 34 and the inside surface of jacket 20 can easily be made to be considerably greater than any pressure exerted by the injected pressure medium. Similarly, the pressure of the gasket against the annular wall 32 is sufficiently high so that a shear force, which would cause a separation of that interface, significantly exceeds the pressure of an injected medium injected between the jacket and the concrete member.

As will be appreciated by those skilled in the art, the axial compression of gasket 34 represents a significant compression force, especially considering the fact that the compression force causes a flowing or intrusion of the gasket into the grout space. It is not clear based upon present tests performed thus far, whether the injected medium distorts the jacket by outward swelling and is thereafter displaced by the axial growth of gasket 34, or whether the gasket 34 generates sufficient radially outward directed pressure so as to cause an outward bulge in the jacket in the manner similar to that above by the pressure medium.

In either event, a substantial intrusion of the gasket material into the grout space has been found to occur and is regarded as being desirable to attain the sealing pressures sought after. The distortion of gasket 34 is accomplished by a poissons effect experienced by the jacket. As the injected medium swells medial portions of the jacket, the end portions thereof are contracted or advanced toward each other, in response to the outward swelling. The magnitude of the outward swelling of the jacket can be carefully controlled, and well established physical principles can be applied to calculate or otherwise estimate the inward contraction of the ends of the jacket. Accordingly, the amount of compression and pressure imparted to the gasket 34 can also be accurately determined beforehand. The concrete member 12 placed in radially inward compression by the pressurized medium performs an opposite distortion but the magnitude of distortion is much smaller, (in one embodiment is approximately 1/30 that of the jacket) and consequently is ignored. The inward compression and outward growth of the concrete member is ignored for practical purposes, and it is assumed that the concrete member is rigid.

Grout enters and is initially free to flow between the jacket and the outer surface of the concrete member, impeded only by the viscous forces and the force needed to peel the jacket away from the concrete member, and to swell the jacket. At first, swelling is relatively easy and requires relatively little work as central portions of the jacket are deformed. Thereafter, increasingly greater amounts of work with attendant higher applied pressures are exerted on previously injected portions of the grout. The amount of work and the pressure levels exerted on the earliest portions of injected grout increase as deformation of the jacket approaches the axial ends thereof, which, according to one aspect of the present invention, are bound by a relatively massive end wall so as to prevent outward bulging thereat. As the internal pressures and total outward displacement of the jacket grow, the ends of the jacket respond by shortening, according to the poisson's ratio for the jacket configuration.

While the generation of internal pressure within the gaskets will increase their sealing strength, the present invention contemplates a more drastic effect, such as a flowing of the gasket in a manner causing either an outward swelling of the jacket surrounding and in contact with the gasket, and/or the intrusion of gasket material into the grout space. As mentioned above, the physical properties and geometry of the gasket may be chosen to augment this effect. For example, the gasket can have a cylindrical or a conically tapered collar portion of reduced cross section axially extending toward the axial center of the concrete article. Other variations are, of course, possible.

As will now be apparent to those skilled in the art, several variations can be made in the above-described concrete article assembly. As has been detailed above, the present invention utilizes the poisson's ratio of the outer surrounding jacket in order to inwardly displace gasket-contacting end fittings so as to increase the pressure engagement thereof with an inner surface of the jacket, thereby significantly increasing the sealing pressure which is relied upon to contain the injected pressure medium. As has been described above, the inwardly directed pressure, generated by the poissons ratio of the jacket, produces a flowing of a resilient gasket material into the grout space between the jacket and the concrete article. FIGS. 8 and 9 are similar to the view of FIG. 4, but show an alternative gasket 100 which may be made of a rigid or semirigid material having a generally C-shaped cross-section, with the concave interior receiving the beveled end portion 102 of the concrete article. The free ends of the gasket preferably comprise conical portions 104 with an interior beveled surface 106 which opens toward the concrete article so as to contact the outer surface 108 thereof, when urged toward the center of the article (see arrow 110) under pressure of the hardenable medium.

Upon the application of an inward directed pressure, due to the poisson's ratio of the jacket, the beveled surface 106 of the gasket 100 advances toward the center of the concrete article with an effect similar to that of an inclined plane, thus advancing the free end of the gasket in a radial outward direction, wedging the gasket between the jacket 20 and concrete article 12 and intruding into the grout space 120.

Preferably, however, the gasket is made of a material which "grows" significantly in a radial outward direction during compression by the poisson's generated force. Most preferably, the gasket is made of a resilient material, as described above, which flows freely under the application of the poisson's force so as to readily expand in a radial outward and longitudinal directions, thus entering the grout space.

In any event, the gasket utilized in practicing the present invention is induced under pressure of the hardenable medium to at least partially fill the grout space between the jacket and the outer surface of the concrete article, thus increasing the sealing pressure of the gasket.

It can be seen from the above, that the present invention provides a heretofore unattainable high strength pressure seal at the ends of a concrete article which is prestressed by the injection of a fluid medium around the outer surface of the concrete article. The improved seal is provided with a minimum number of relatively inexpensive components, and in general, does not require a high level of expertise and previous experience for the successful installation of the seal.

It will thus be seen that the objects hereinbefore set forth may readily and efficiently be attained and, since certain changes may be made in the above construction and different embodiments of the invention without departing from the scope thereof, it is intended that all matter contained in the above-description or shown in the accompanying drawings, shall be interpreted as illustrative and not in a limiting sense.

What is claimed is:

1. A prestressed concrete article comprising:
   a cylindrical body with opposed ends and a generally cylindrical outer surface;
   a cylindrical jacket having a predetermined strength to resist distortion when placed under pressure, said jacket placed around the outer cylindrical surface of the concrete article;
   end walls of greater strength overlying the ends of the article, adjacent the ends of the jacket;
   gasket rings between the end walls and the ends of the concrete article;
   end joining means for joining the ends of the jacket to the end walls so that tension forces applied to the end walls compress the end walls against the ends of said concrete article;
   a hardenable medium fluidally injected between said jacket and said outer surface of said concrete article, migrated throughout the major portion of said concrete article outer surface;
   an annular cavity between said jacket and said concrete article outer surface formed by an outward swelling of said jacket by said injected medium, said cavity filled with said hardenable medium; and
   ends of the jacket compressed together, pressing said gasket rings against the ends of said concrete article, with said gasket rings entering into said cavity under the pressure of said hardenable medium, said gasket rings intimately engaging and generating a sealing pressure between opposed portions of said jacket and said concrete article outer surface;
   whereby a fluid-tight pressure cavity is formed surrounding the outer surface of said concrete article and maintaining the pressure until the injected medium hardens.

2. The concrete ar.ticle of claim 1 wherein the end rings include mating couplings for mating to the end of an adjacent concrete article.

3. The concrete article of claim 1 wherein the end wall is annular.

4. The concrete article of claim 1 wherein the hardenable medium comprises cementitious grout.

5. The concrete article of claim 1 wherein the gasket rings are made of resilient material and portions thereof are flowed into said cavity under pressure of said hardenable medium.

6. The concrete article of claim 1 wherein the gasket rings are made of rigid material and are pushed to wedge between said jacket and the concrete article under pressure of said hardenable medium.

* * * * *

UNITED STATES PATENT AND TRADEMARK OFFICE
CERTIFICATE OF CORRECTION

PATENT NO. : 5,065,795

DATED : November 19, 1991

INVENTOR(S) : Richard L. Creedon

It is certified that error appears in the above-identified patent and that said Letters Patent is hereby corrected as shown below:

In column 2, line 20, change "fluidally" to read --fluidically--.

In column 4, lines 2-3, change "fiber-inforced" to read --fiber-reinforced--.

In column 6, line 6, after the word "to" insert the word --as--.

In column 8, line 51, change "in3ection" to read --injection--.

In column 9, line 21, change "sot" to read --so--.

In column 11, line 26, change "poissons" to read --poisson's--.

In column 11, line 54, delete "a".

In column 12, line 31 (claim 1) change "fluidally" to read --fluidically--.

In column 12, line 50 (claim 2) change "ar.ticle" to read --article--.

Signed and Sealed this

Twentieth Day of April, 1993

*Attest:*

MICHAEL K. KIRK

*Attesting Officer*     *Acting Commissioner of Patents and Trademarks*